March 7, 1950 W. G. WOOD 2,499,619
TORQUE ARM QUICK DISCONNECT ASSEMBLY
Filed March 21, 1947
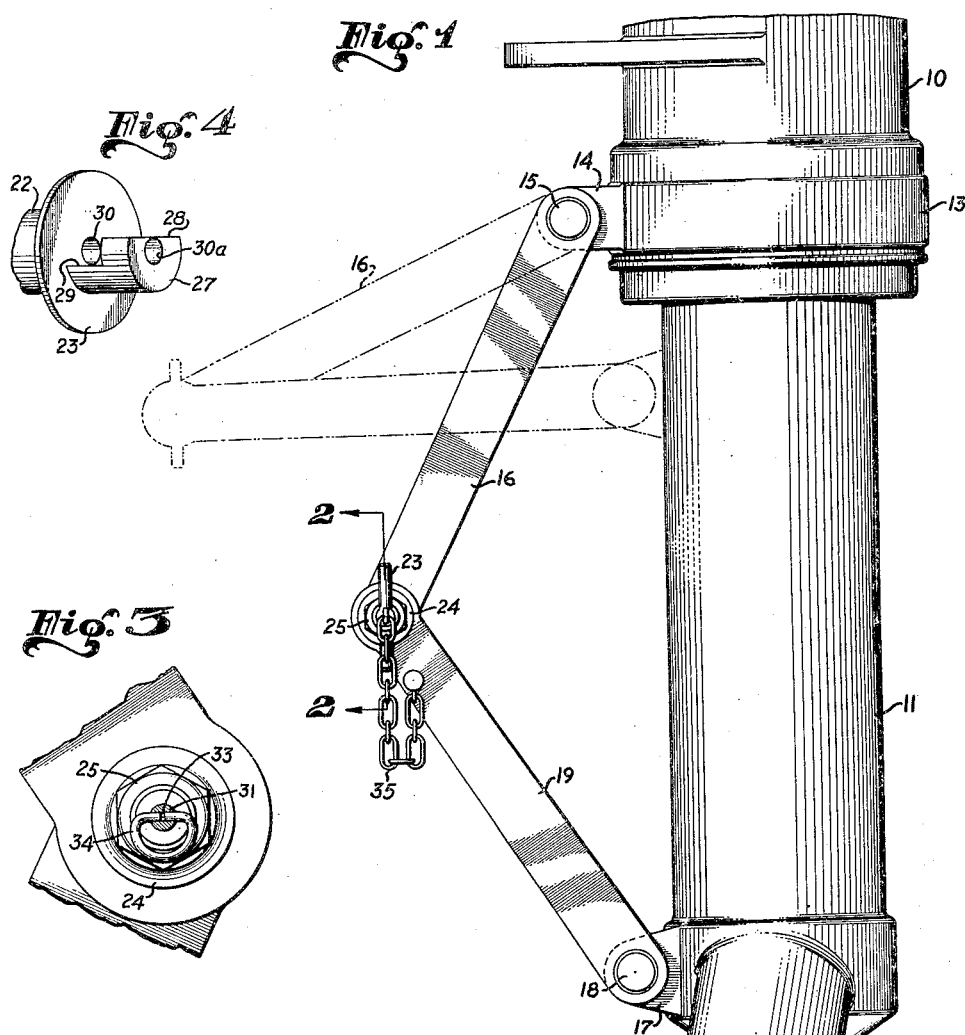
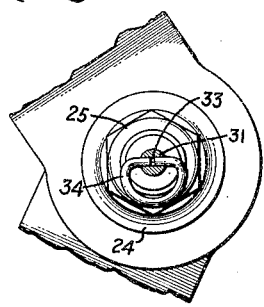
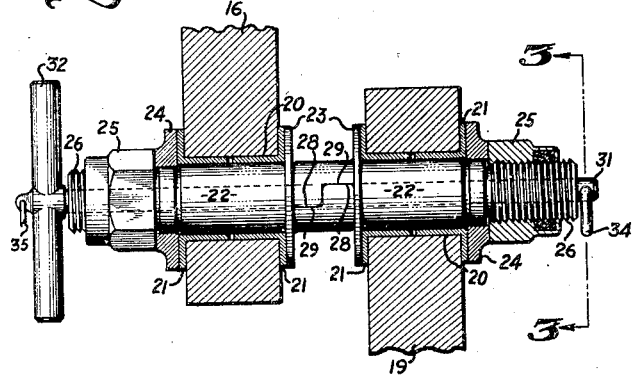
INVENTOR:
WILBUR G. WOOD.
BY Hudson Maltby
and Biehler
ATTORNEYS.

Patented Mar. 7, 1950

2,499,619

UNITED STATES PATENT OFFICE 2,499,619

TORQUE ARM QUICK DISCONNECT ASSEMBLY

Wilbur G. Wood, Burbank, Calif., assignor to Menasco Manufacturing Company, Burbank, Calif., a corporation of California Application March 21, 1947, Serial No. 736,378

7 Claims. (Cl. 287—96)

This invention relates to aircraft landing gear and more especially to quick disconnect features for the torque arm assembly thereof.

This invention is directed particularly to the landing gear of aircraft of the type wherein a landing wheel frame is secured to a piston which is reciprocable in a cylinder having hydraulic and pneumatic cushioning characteristics to receive and absorb the ground shocks when the craft is landing.

In landing gear of this type the piston and wheel frame may be turned or rotated by the pilot of the craft; however, when the craft is being maneuvered on the ground, such as by being towed by tractor or other land vehicle, it is important that the steering means for the wheel frames be disconnected from the steering mechanism actuated by the pilot. The wheel frame and piston are connected to a steering collar on the cylinder by a torque arm assembly and this assembly is provided with quick disconnect features which are the subject of this invention.

It is, therefore, the general object of my invention to provide a torque arm structure for aircraft landing gear having means to permit quick separation of the torque arm members.

A more specific object of the invention is to provide a novel torque arm assembly of the character described having a bearing member pivotally secured to one of the torque arm members by a simple retractable pin which is readily withdrawn to permit the disconnection but is securely held in position when the torque arms are connected.

Other objects and advantages will appear and be brought out more fully in the following specification considered with reference to the accompanying drawing throughout which like parts are designated by like numerals.

In the drawing:

Figure 1 is a side elevation view of a portion of a landing gear unit showing the torque arm quick disconnect assembly of my invention.

Figure 2 is an enlarged sectional view taken along the line 2—2 of Figure 1.

Figure 3 is an elevational view as seen from line 3—3 of Figure 2.

Figure 4 is a fragmentary perspective view of one of the bearing membes shown in Figure 2.

Referring more particularly to the drawing I show a hydraulic and pneumatic cylinder 10 suitably mounted to an under portion of an aircraft in which cylinder a piston 11 is reciprocable, a wheel frame 12 being integrally associated with or suitably secured to the piston. A steering collar 13 is bearing mounted on cylinder 10 and suitably connected by linkage to steering apparatus actuatable by the pilot. Collar 13 has a tongue 14 providing a bearing for a bearing pin 15 to which is also connected one end of a torque arm link member 16. Piston 11 has a tongue forming a bearing for a bearing pin 18 to which is connected one end of torque arm or link member 19.

The adjacent ends of torque arms 16 and 19 are each formed with an aperture 20 in each of which apertures are a pair of bearing elements 21 and a bearing member 22 extends through the bearing elements 21 of each torque arm. Each bearing member 22 is formed with a flange 23 adjacent one of the bearing elements 21 and a collar 24 secured by lock nut 25 on the threaded end 26 of the bearing member is held adjacent the other bearing element 21.

Each bearing member 22 has an extension portion 27 formed with transverse flat face portions 28 and 29, portion 29 being formed as a recess for interfitting engagement with the end portion of the complementary bearing member extension 27. The bearing members 22 are each provided with a bore 30 and a bore potrion 30a in extension 27, bores 30 and 30a being in alignment.

A locking pin 31 is provided and extends through the bore 30 and 30a of both bearing members 22 and has a suitable handle portion 32 at one end. A transverse bore 33 is formed adjacent the other end of pin 31 and is adapted to receive a spring locking element 34 which is shown as being a C-ring. A chain 35 may be provided to secure pin 31 to torque arm member 19.

The operation of the invention should be clear from the foregoing description. Bearing member 22 has a hook-like interengagement, the extension 27 of each of the bearing members being positioned adjacent flange 23 of the other member. Pin 31 prevents separation of the bearing members, any initial separation movement being in a plane transverse with the axis of the pin and bores 30. When it is desired to disconnect the torque arm assembly, lock element 34 is first removed from pin 31 and the pin then removed from one of the bearing members. The bearing members may then be separated by shifting movement at right angles to the pin axis. Reconnection of the assembly is accomplished by the reverse steps in an obvious manner.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim as new and desire to secure by Letters Patent is:

1. A torque arm quick disconnect assembly comprising in combination a pair of link members each having a bearing aperture, a bearing member in each of said apertures, said bearing members each having a bore and complementary interfitting portions comprising radially disposed projections directed laterally inwardly toward the axis of the bearing member, and a pin extending through said bores, said bearing members being non-separable when said pin is positioned in said bores.

2. A a torque arm quick disconnect assembly comprising in combination a pair of link members each having a bearing aperture, a bearing member in each of said apertures, said bearing members each having a bore and complementary interfitting hook-shaped portions, and a pin extending through said bores, said bearing members being non-separable when said pin is positioned in said bores.

3. A torque arm quick disconnect assembly comprising in combination a pair of link members each having a bearing aperture, a bearing member in each of said apertures, said bearing members each having complementary interfitting hook-shaped portions and a bore through said members and said hook-shaped portions and a removable pin extending through said bores, said bearing members being separable by movement at an angle to said bore when said pin is removed from said bores.

4. A quick disconnect assembly comprising in combination a pair of link members each having a bearing aperture, a bearing member for each link member, said bearing members comprising shanks in the respective apertures, flanges on the bearing members adjacent the shanks bearing against the respective link member and complementary interfitting portions on adjacent ends of the shanks each including a transversely projecting head having a radially disposed flat surface and a recess having a flat surface bottom each said recess being adapted to receive a portion of the head of the respectively opposite shank, with flat surfaces in face to face relation, said shanks and heads having axially aligned bores and a pin removably secured in said bores.

5. A quick disconnect assembly comprising in combination a pair of link members each having a bearing aperture, a bearing member for each link member each having a shank in said bearing aperture, a flange on each shank overlying one side of the respective link member, a threaded end on the shank at the other side and means for rotatably anchoring said bearing members to the respective link members, said bearing members having complementary hook-shaped portions including heads and recesses adjacent the heads adapted to receive the heads of the complementary hook-shaped portions, said bearing members having axially aligned bores and a pin removably secured to the bearing members in said bores.

6. A quick disconnect assembly comprising in combination a pair of link members each having a bearing aperture, bearing elements lining said apertures including parts overlying said link members, a bearing member for each link member each having a shank in a bearing element, a flange on the bearing member overlying one side of the link member, a threaded end on the bearing member at the other side and means for rotatably anchoring said bearing members to the respective link members, said bearing members having complementary hook-shaped portions including heads and recesses adjacent the heads adapted to receive the heads of the complementary hook-shaped portions, said bearing members having axially aligned bores extending through the shanks and heads and a pin removably secured to the bearing members in said bores.

7. A torque arm quick disconnect assembly comprising in combination a pair of link members each having a bearing aperture, a bearing member in each of said apertures, each said bearing member having a shank with an end projecting toward the respectively opposite shank, said ends including complementary axially disposed surfaces having positions face to face when the torque arm is connected wherein the shanks are held non-rotatable relative to each other and complementary overhanging radially disposed surfaces having positions face to face when the torque arm is connected wherein the shanks are held against endwise separation, axially aligned bores in said shanks and a removable pin in the bores adapted to hold the torque arm in connected position wherein said surfaces are maintained in respective face to face positions.

WILBUR G. WOOD.

REFERENCES CITED

The following references are of record in the file of this patent:

UNITED STATES PATENTS

| Number | Name | Date |
|--------|------|------|
| 337,761 | French | Mar. 9, 1886 |
| 627,946 | Wilcox | June 27, 1889 |
| 1,173,289 | McKee et al. | Feb. 29, 1916 |
| 1,365,363 | Adams | Jan. 11, 1921 |
| 1,854,195 | Hufferd | Apr. 19, 1932 |